March 14, 1950  E. J. CARLETON  2,500,450
CONTROL VALVE FOR FLUID-PRESSURE SYSTEMS
Filed Feb. 27, 1948  4 Sheets-Sheet 1
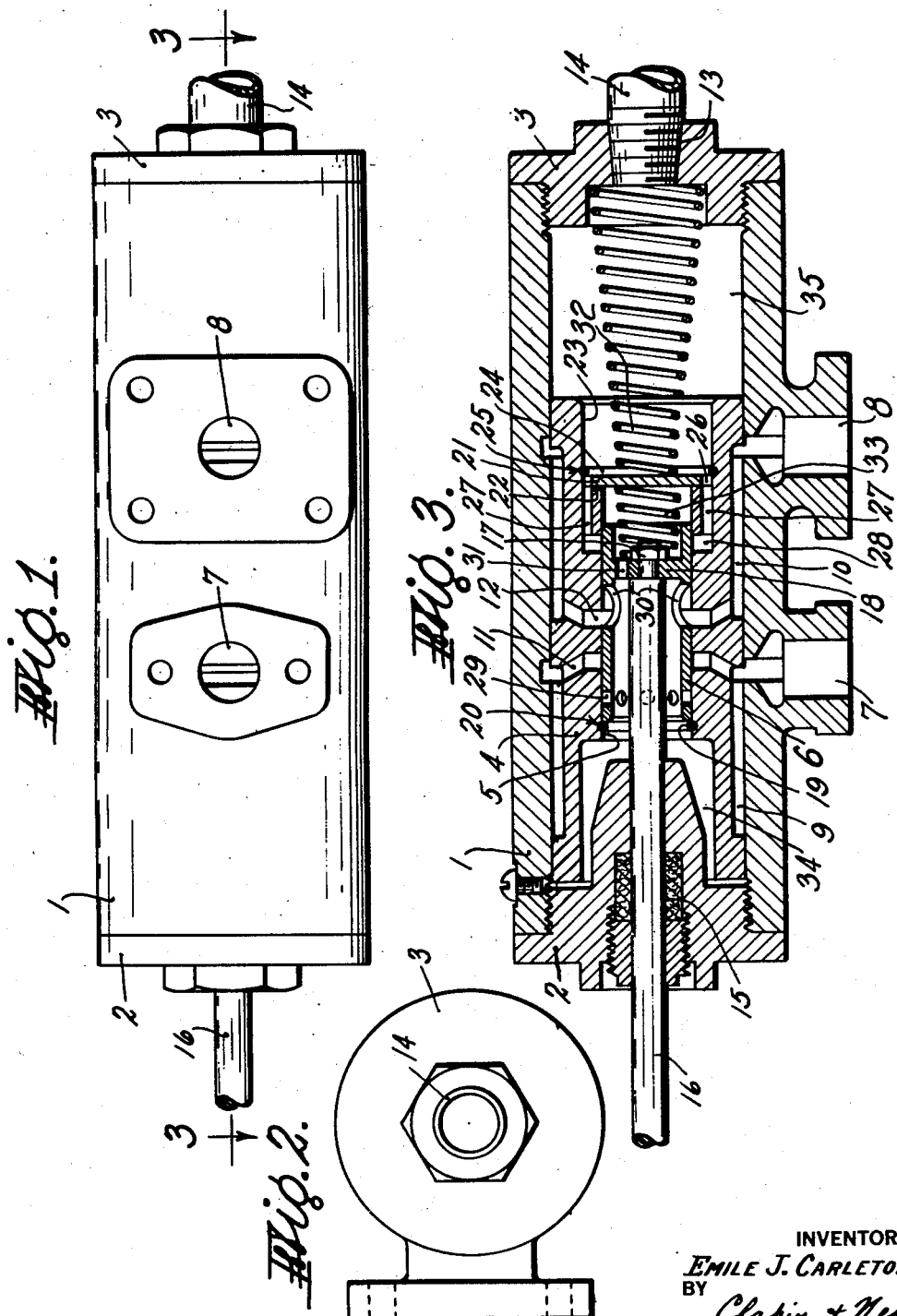
INVENTOR
EMILE J. CARLETON
BY
Chapin + Neal
ATTORNEYS

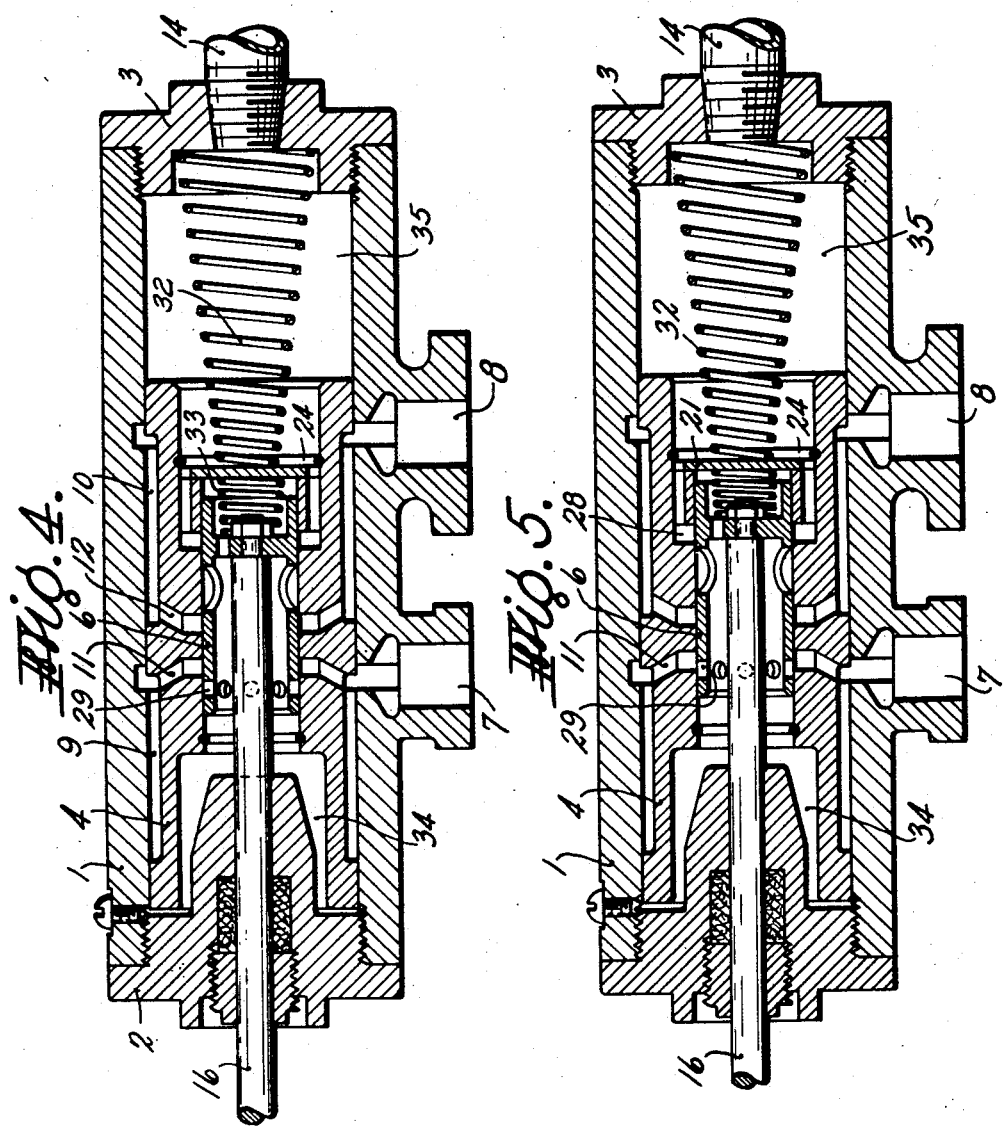

March 14, 1950 E. J. CARLETON 2,500,450
CONTROL VALVE FOR FLUID-PRESSURE SYSTEMS
Filed Feb. 27, 1948 4 Sheets-Sheet 3
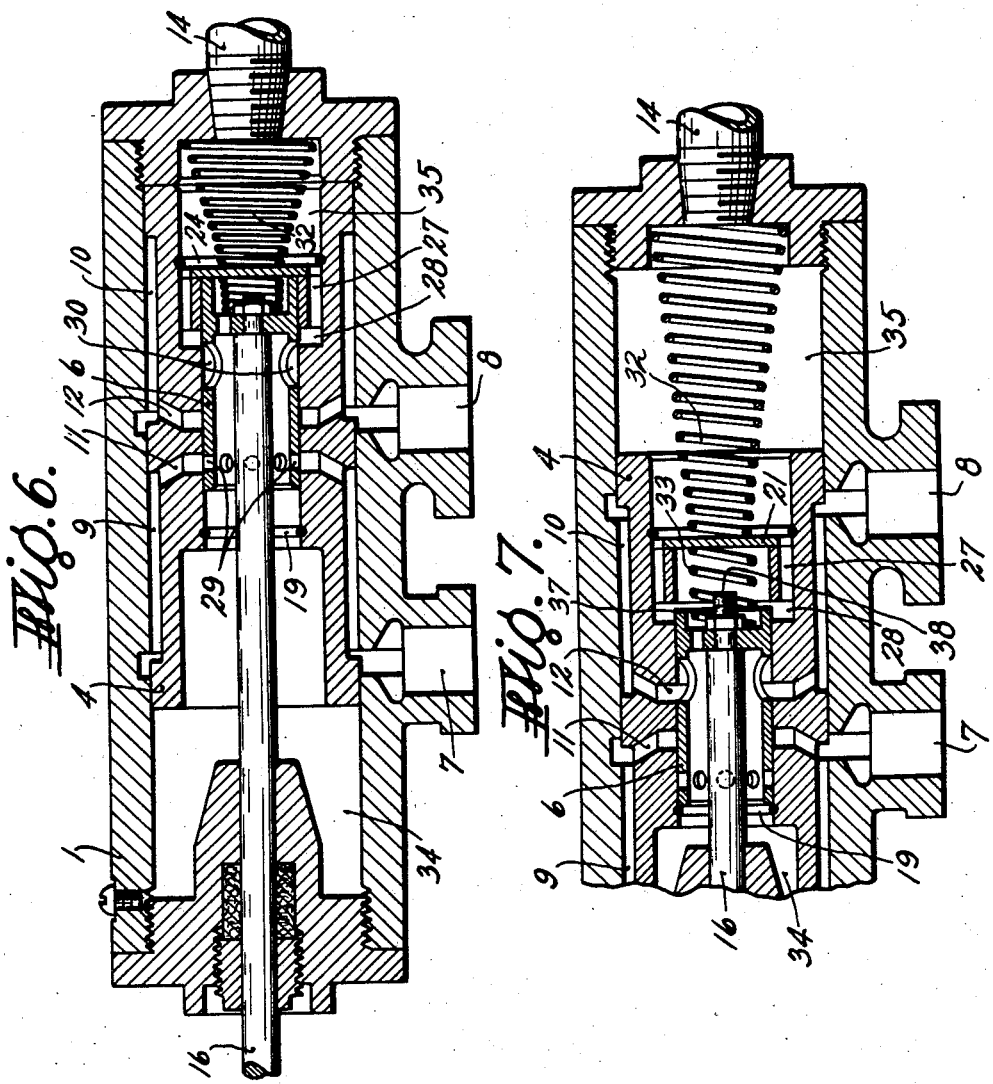
INVENTOR
EMILE J. CARLETON
BY
Chapin & Neal
ATTORNEYS

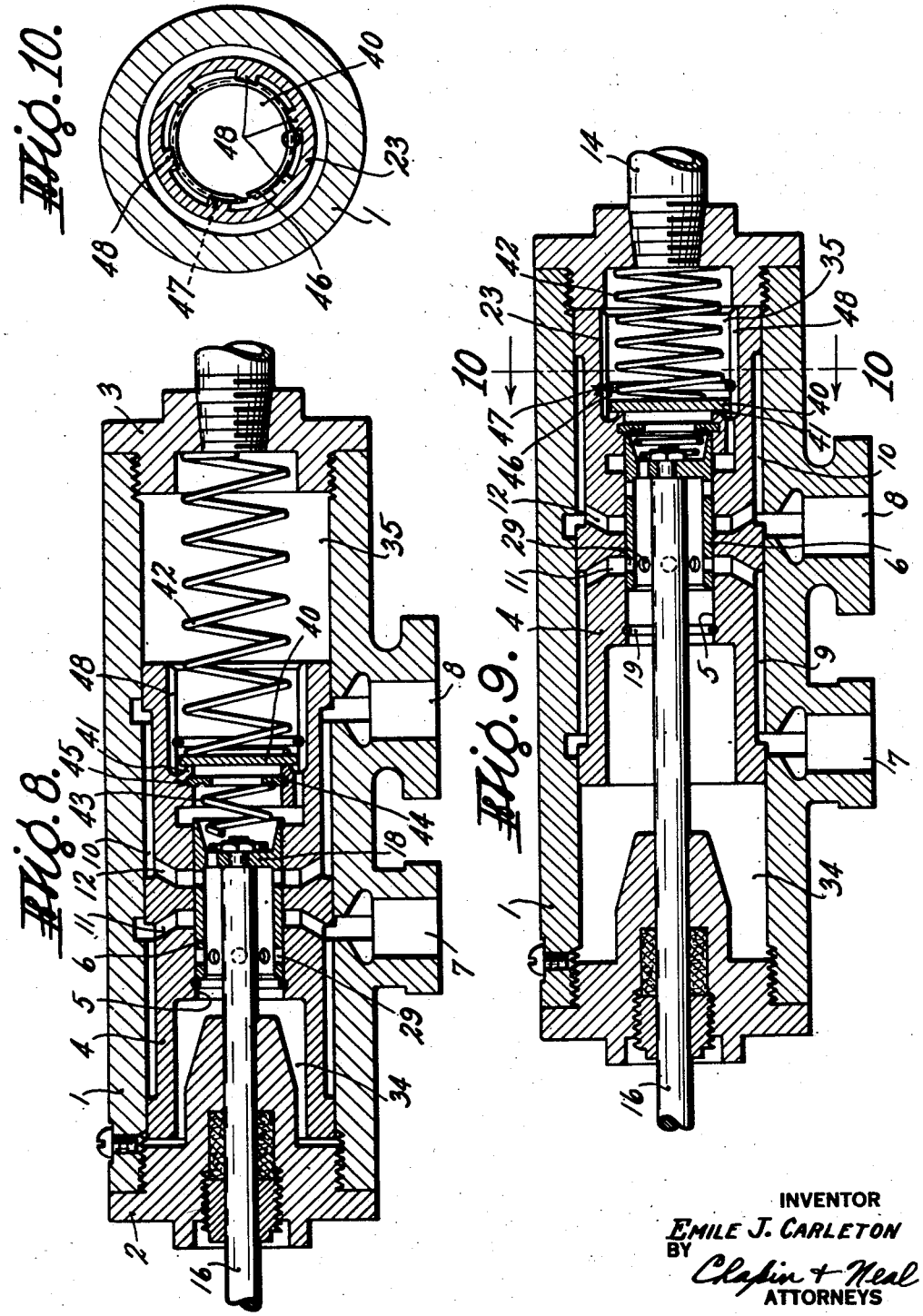

Patented Mar. 14, 1950

2,500,450

UNITED STATES PATENT OFFICE 2,500,450

CONTROL VALVE FOR FLUID-PRESSURE SYSTEMS

Emile J. Carleton, Holyoke, Mass., assignor to Hydraulic Engineering Co., Inc., Holyoke, Mass., a corporation of Massachusetts Application February 27, 1948, Serial No. 11,387

3 Claims. (Cl. 137—139)

This invention relates to a hand operated control valve for fluid pressure systems such as are used for the operation and control of power shovels and similar machines and for the operation and control of fluid clutches, brakes and the like.

One object of the invention is to provide a more responsive control and one in which finer increments of movement of the controlled mechanisms are obtainable.

Other and further objects will be apparent from the following specification and claims.

In the accompanying drawings,

Fig. 1 is a side view of a control cylinder embodying the invention;

Fig. 2 is an end view looking from the right of Fig. 1;

Fig. 3 is a sectional view substantially on line 3—3 of Fig. 1, the members being shown in exhaust position;

Fig. 4 is a view similar to Fig. 3 but showing the members moved to neutral position;

Fig. 5 is a similar view showing the members in initial operating position;

Fig. 6 is a similar view showing the members in position for full power control;

Fig. 7 is a similar view showing a modified form, the members being in exhaust position;

Fig. 8 is a similar view of a second modification;

Fig. 9 is a similar view showing the form of Fig. 8 with the members in full operative position; and Fig. 10 is a detail view substantially on line 10—10 of Fig. 9.

Referring to Figs. 1, 2 and 3 the control is shown as comprising a cylindrical casing 1 provided with heads 2 and 3. Reciprocably mounted in the cylinder is a floating piston member 4. The member 4 is centrally bored as at 5 to receive a hollow cylindrical valve member 6. The casing 1 is provided with a power inlet opening 7 and an exhaust opening 8 which respectively communicate with respective annular power and exhaust grooves 9 and 10 in the member 4. One or more ports 11 open from power groove 9 to the bore 5 and one or more ports 12 open from exhaust groove 10 to the bore 5.

Cylinder head 3 is provided with a threaded service opening 13 to receive a pipe 14 by which fluid is conducted to the servo-motor or other fluid pressure operated device to be controlled.

Head 2 is provided with a suitable stuffing box 15 through which extends a rod 16 the inner end of which is connected as by nut 17 to a partition member 18 extending across the interior of hollow valve member 6. Rod 16 affords means by which the member 6 may be manually moved relative to member 4.

Rearward movement of rod 16 and valve member 6, which is secured thereto, is limited by a spring ring 19 which seats in a groove 20 formed in the wall of bore 5. The forward end of bore 5 is closed by a disc 21 seating against a shoulder 22 formed by an enlargement 23 of the forward end of the bore, the disc being held in place by a spring ring 24 seating in a groove 25 formed in the wall of the enlargement. The disc 21 is formed adjacent its periphery with openings 26 which communicate with passages 27 formed in member 4 and which open through ports 28 to the bore 5. The member 6 is provided adjacent its rear end with ports 29 and intermediate its length with ports 30. A passage 31 extends through partition 18.

A spring 32 compressed between cylinder head 3 and disc 21 tends to maintain the piston 4 at the rear of the cylinder as shown in Fig. 3. The forward movement of member 6 relative to piston 4 is limited by the contact of the forward end of member 6 with the disc 21, and a spring 33 positioned between partition 18 and disc 21 normally maintains the member 6 at the rear of bore 5.

When the members are in the position shown in Fig. 3 the power ports 11 are closed, while the exhaust ports 12 communicate through ports 30 with the interior of member 6 and through the open rear end of the latter with chambers 34 at the rear of piston 4. The space between partition 18 and disc 21 is also exhausted through passage 31. Any fluid pressure existing in the system to which pipe 14 is connected, and in the forward chamber 35 acts with spring 32 to maintain piston 4 at the rear of the cylinder.

Upon the initial forward movement of member 6 by the manual manipulation of rod 16 the exhaust ports are closed as shown in Fig. 4, the power ports remain closed, and member 4 maintains its position at the rear of the cylinder.

Upon forward movement of member 6 from the neutral position of Fig. 4 to the position shown in Fig. 5 the power ports 11 are opened to ports 29 and through the latter ports to the interior of member 6, and chamber 34. The fluid pressure entering through the power inlet 7 advances the piston 4 in cylinder 1 applying pressure to the fluid in chamber 35 and to the system connected thereto through pipe 14. If rod 16 is simultaneously advanced to maintain ports 11 and 29 in communication the member 4 advances to the forward end of the cylinder as shown in Fig. 6. As will be obvious by suitably manipulating the rod 16 this advance of member 4 in the cylinder may be under a full opening of ports 11—29 or under a throttled opening, and the advance may be halted or reversed by reestablishing the neutral or exhaust relationships of Figs. 4 and 3 respectively.

Usually the advance of member 4 to the end of the cylinder will be rapid and will compensate for small losses of fluid in the controlled system. When the member 4 reaches the position of Fig. 6, assuming that member 6 has been correspondingly advanced, the ports 28 are opened to ports 30 so that the fluid pressure from power opening 7 directly enters chamber 35 and the system operated through pipe 14.

In Fig. 7 is shown a modified arrangement, in which the forward end of member 6 is cut away as at 37 so that ports 28 are uncovered when the members are in the exhaust position thus opening chamber 35 to the exhaust as well as chamber 34. In this arrangement the forward end of rod 16 is extended as at 38 to engage disc 21 and limit the forward movement of member 6 relative to member 4.

A further modification is shown in Figs. 8, 9 and 10. In this form as in the form just described both sides of the member 4 are exhausted when the member 6 is in exhaust position as in Fig. 8. In this form the fixed disc 21 previously described is replaced by a disc 40 which is normally held against shoulders 41 by a spring 42 compressed between the disc and cylinder head 3. This spring in addition to normally holding the disc 40 in closed position also performs the same function as spring 32 previously described. The member 6 is biased to the rear by a spring 43, similar in function to spring 33, which is compressed between the portion 18 and a spring ring 44 seated in a groove 45 in the wall of bore 5. Disc 40 acts as a check valve and when the members 4 and 6 are in relative position to admit power to cylinder 1 as in Fig. 9, if the pressure at the rear of disc 40 is greater than in chamber 35, the disc is forced forwardly against the action of spring 42. Such forward movement of disc 40 is limited by a spring ring 46 seating in groove 47 formed in ribs 48 extending from the walls of the enlarged portion 23 of bore 5. As will be apparent when disc 40 is unseated fluid under pressure can pass between the shoulders 41 and the disc and between the ribs 48 to chamber 35 and the system connected to pipe 14.

This last described form has particular advantage in the operation of fluid clutches of the type in which a tubular member of rubber and fabric is expanded against an opposing member to establish a driving engagement between the two. In this and similar uses the check valve action of disc 40 admits fluid to the system as needed to compensate for the wear of the rubber clutch member.

What I claim is:

1. A device for controlling fluid pressure which comprises a hollow cylinder closed at its ends, a piston reciprocably mounted therein, said piston being provided with a central bore, a hollow cylindrical valve member reciprocably mounted in said bore, a closure for the forward end of said piston, a rod connected to said valve member and extending outwardly through the rear end of the cylinder for manually moving the valve member relative to the piston, a service outlet opening through the forward end of the cylinder, a fluid pressure inlet and an exhaust outlet through the walls of the cylinder, a power groove and an exhaust groove formed in the outer wall of the piston and respectively communicating with said inlet and exhaust outlet in all positions of the piston in the cylinder, passages from said grooves to said bore, ports extending through said valve member and positioned to selectively open said passages to the portion of the cylinder at the rear of the piston upon relative movement between the valve member and piston, a passage extending from the forward end of the piston and opening to said bore for transmitting fluid pressure directly through the piston to said service outlet, and valve means controlling said last named passage.

2. A device for controlling fluid pressure which comprises a hollow cylinder closed at its ends, a piston reciprocably mounted therein, said piston being provided with a central bore, a hollow cylindrical valve member reciprocably mounted in said bore, a closure for the forward end of said piston, a rod connected to said valve member and extending outwardly through the rear end of the cylinder for manually moving the valve member relative to the piston, a service outlet opening through the forward end of the cylinder, a fluid pressure inlet and an exhaust outlet through the walls of the cylinder, a power groove and an exhaust groove formed in the outer wall of the piston and respectively communicating with said inlet and exhaust outlet in all positions of the piston in the cylinder, passages from said grooves to said bore, ports through said valve member and positioned to selectively open said passages to the portion of the cylinder at the rear of the piston upon relative movement between the valve member and piston, a passage extending from the forward end of the piston and opening to said bore, said last named passage being normally closed by said closure, a spring acting to maintain said closure in passage closing position but yieldably upon a predetermined decrease of pressure on the side of the closure adjacent the service opening to open said last named passage for transmitting fluid pressure directly through the piston to the service outlet.

3. A device for controlling fluid pressure which comprises a hollow cylinder closed at its ends, a piston reciprocably mounted therein, said piston being provided with a central bore, a hollow cylindrical valve member reciprocably mounted in said bore, a closure for the forward end of said piston, a rod connected to said valve member and extending outwardly through the rear end of the cylinder for manually moving the valve member relative to the piston, a service outlet opening through the forward end of the cylinder, a fluid pressure inlet and an exhaust outlet through the walls of the cylinder, a power groove and an exhaust groove formed in the outer wall of the piston and respectively communicating with said inlet and exhaust outlet in all positions of the piston in the cylinder, passages from said grooves to said bore, ports extending through said valve member and positioned to selectively open said passages to the portion of the cylinder at the rear of the piston upon relative movement between the valve member and piston, a passage extending from the forward end of the piston and opening to said bore, said last named passage being positioned to communicate with the interior of the valve member through one of said ports when another of said ports is opened to the power groove to transmit fluid pressure directly through the piston to the service outlet.

EMILE J. CARLETON.

REFERENCES CITED

The following references are of record in the file of this patent:

UNITED STATES PATENTS

| Number | Name | Date |
| --- | --- | --- |
| 1,119,640 | Roettger | Dec. 1, 1914 |
| 1,957,759 | Clates | May 8, 1934 |
| 2,446,149 | Wells | July 27, 1948 |
| 2,455,315 | Rose | Nov. 30, 1948 |